United States Patent [19]

Michelotti et al.

[11] Patent Number: 4,971,843

[45] Date of Patent: * Nov. 20, 1990

[54] NON-IRIDESCENT INFRARED-REFLECTING COATED GLASS

[75] Inventors: Joseph E. Michelotti, Church Creek, Md.; Vern A. Henery, Pittsburgh, Pa.

[73] Assignee: PPG Industries, Inc., Pittsburgh, Pa.

[*] Notice: The portion of the term of this patent subsequent to Apr. 22, 2003 has been disclaimed.

[21] Appl. No.: 768,922

[22] Filed: Aug. 23, 1985

Related U.S. Application Data

[63] Continuation of Ser. No. 518,592, Jul. 29, 1983, abandoned.

[51] Int. Cl.$^5$ .................... B32B 17/06; B05D 7/00
[52] U.S. Cl. ........................ 428/34; 350/1.6; 350/1.7; 350/166; 427/404; 428/212; 428/215; 428/216; 428/428; 428/432; 428/702
[58] Field of Search ............... 428/432, 34, 428, 215, 428/212, 216, 702; 350/1.6, 1.7, 166; 427/404

[56] References Cited

U.S. PATENT DOCUMENTS

| | | | |
|---|---|---|---|
| 2,564,708 | 8/1951 | Mochel | 428/432 X |
| 3,149,989 | 9/1964 | Johnson | 428/432 X |
| 3,514,175 | 5/1970 | Jenkins | 350/1.6 |
| 3,531,313 | 9/1970 | Pates | 428/432 X |
| 3,694,299 | 9/1972 | Wagner | 428/34 |
| 3,710,074 | 1/1973 | Stewart | 219/203 |
| 3,935,351 | 1/1976 | Franz | 428/34 |
| 3,990,784 | 11/1976 | Gelber | 428/432 X |
| 4,069,630 | 1/1978 | Chess et al. | 52/172 |
| 4,187,336 | 2/1980 | Gordon | 428/34 |
| 4,206,252 | 6/1980 | Gordon | 427/160 |
| 4,235,048 | 11/1980 | Gillery | 428/34 X |
| 4,308,316 | 12/1981 | Gordon | 428/336 |
| 4,377,613 | 3/1983 | Gordon | 428/212 |
| 4,504,109 | 3/1985 | Taga et al. | 350/1.6 |

Primary Examiner—Pamela R. Schwartz
Attorney, Agent, or Firm—Donna L. Seidel

[57] ABSTRACT

A noniridescent, high transmittance, low emissivity, infrared reflecting coated article for solar energy control and a method for its production are disclosed. The article comprises a transparent substrate, an infrared reflecting film which exhibits interference color effects, and a uniformly reflecting, transparent film which is sufficiently reflective in the visible range to mask the interference color effects of the infrared reflecting film.

23 Claims, 3 Drawing Sheets

NON-IRIDESCENT INFRARED-REFLECTING COATED GLASS

This application is a continuation of application Ser. No. 518,592, filed July 29, 1983 and now abandoned.

BACKGROUND OF THE INVENTION

The present invention relates generally to the art of infrared-reflecting coated glass products, and more particularly to non-iridescent, high transmittance, low emissivity, infrared-reflecting coated glass products.

Transparent infrared-reflecting films such as tin oxide may be deposited on a substrate such as glass by a variety of methods, including the application of thermally decomposable compounds to a heated surface. Useful methods for forming transparent infrared reflecting tin oxide films are taught in U.S. Pat. No. 3,107,177 to Saunders et al, U.S. Pat. No. 3,677,814 to Gillery, and U.S. Pat. No. 4,263,335 to Wagner et al.

Tin oxide films are especially effective infrared reflectors at thicknesses of about 1000 to 8000 Angstroms. However, at such thicknesses the films tend to display interference effects, i.e., multiple visible colors commonly referred to as iridescence. These interference effects render the coated glass aesthetically unacceptable for most architectural applications. Iridescence is not observed in thinner films, however these films have insufficient infrared reflectance to be practically useful. Likewise, iridescence is not observed in thicker films; however, these films tend to be hazy and difficult to make uniformly. Therefore, various methods to mask interference effects have been developed.

U.S. Pat. No. 3,710,074 to Stewart discloses an electrically heated multiple glazed window unit having an electroconductive coating on an enclosed surface and a selective reflecting film having an absolute infrared reflectance of at least 0.7 to improve the heat insulating character of the unit and reduce the visible iridescence of the conductive film.

U.S. Pat. No. 4,069,630 to Chess et al discloses a heat reflecting multiple glazed window comprising a colored, heat absorbing exterior glass sheet having a heat reflecting tin oxide film on its interior surface, and an interior glass sheet which may be either clear glass or colored. The tin oxide film typically has an interference color from first order red to fourth order red, the visual effect of which is attenuated by the colored heat absorbing glass.

U.S. Pat. Nos. 4,187,336; 4,206,252 and 4,308,316 to Gordon disclose transparent glass window structures comprising a glass sheet bearing a first coating of infrared reflective material, wherein the observance of iridescence resulting from the first coating is reduced by a second coating of particular refractive index and thickness providing at least two interfaces forming means to reflect and refract light to interfere with the observance of iridescence.

U.S. Pat. No. 4,377,613 to Gordon discloses transparent window structures comprising a glass sheet bearing a coating of infrared reflective material wherein the observance of iridescence is reduced by provision of a very thin coating system beneath the infrared reflective coating which reflects and refracts light to interfere with the observation of iridescence.

SUMMARY OF THE INVENTION

Figure 1:
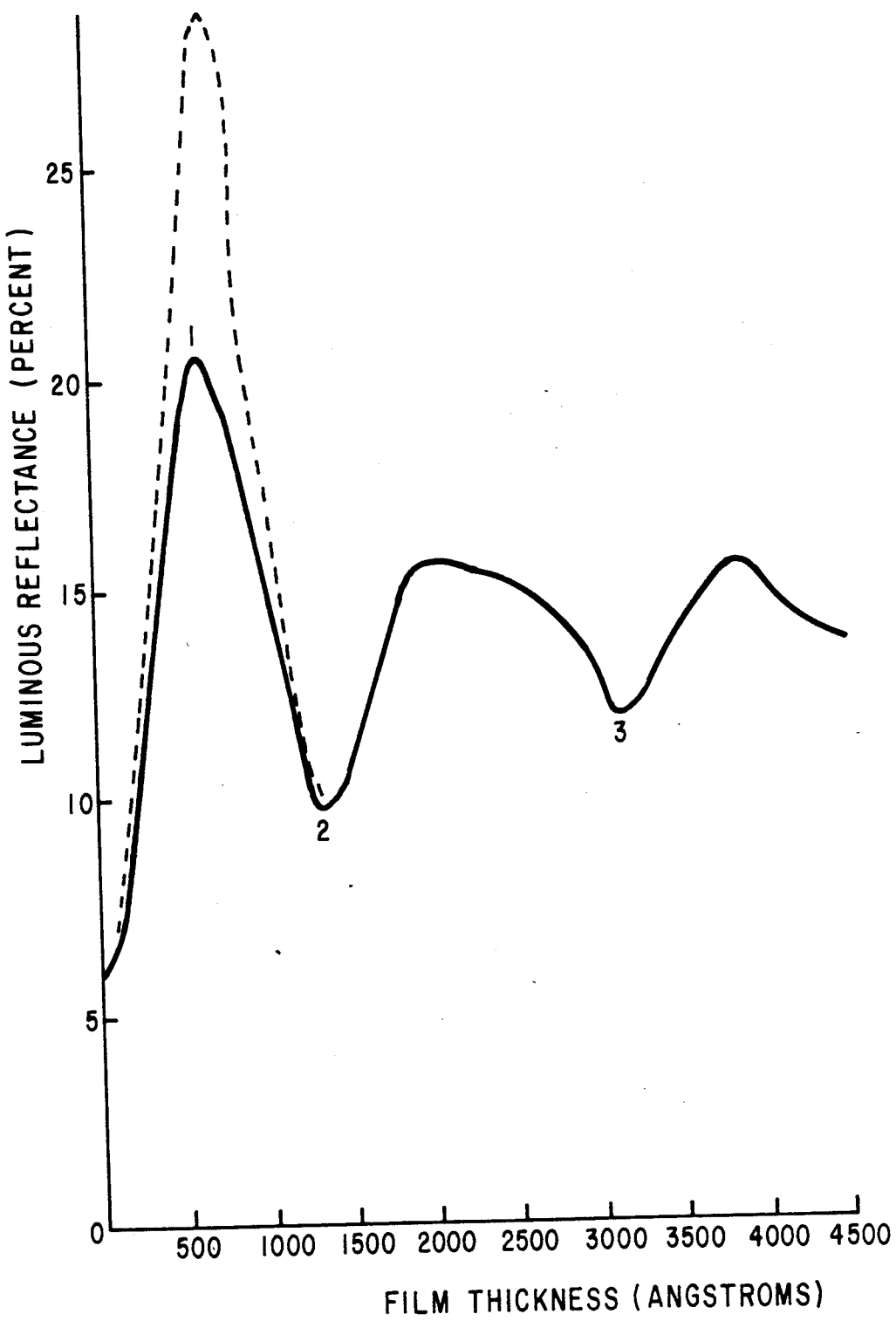
FIG. 1 illustrates the luminous reflectance of a tin oxide film as a function of film thickness. Points 1, 2 and 3 mark the first maximum, first minimum and second minimum respectively. The broken line illustrates the reflectance of a titanium oxide film as a function of film thickness.
Figure 2:
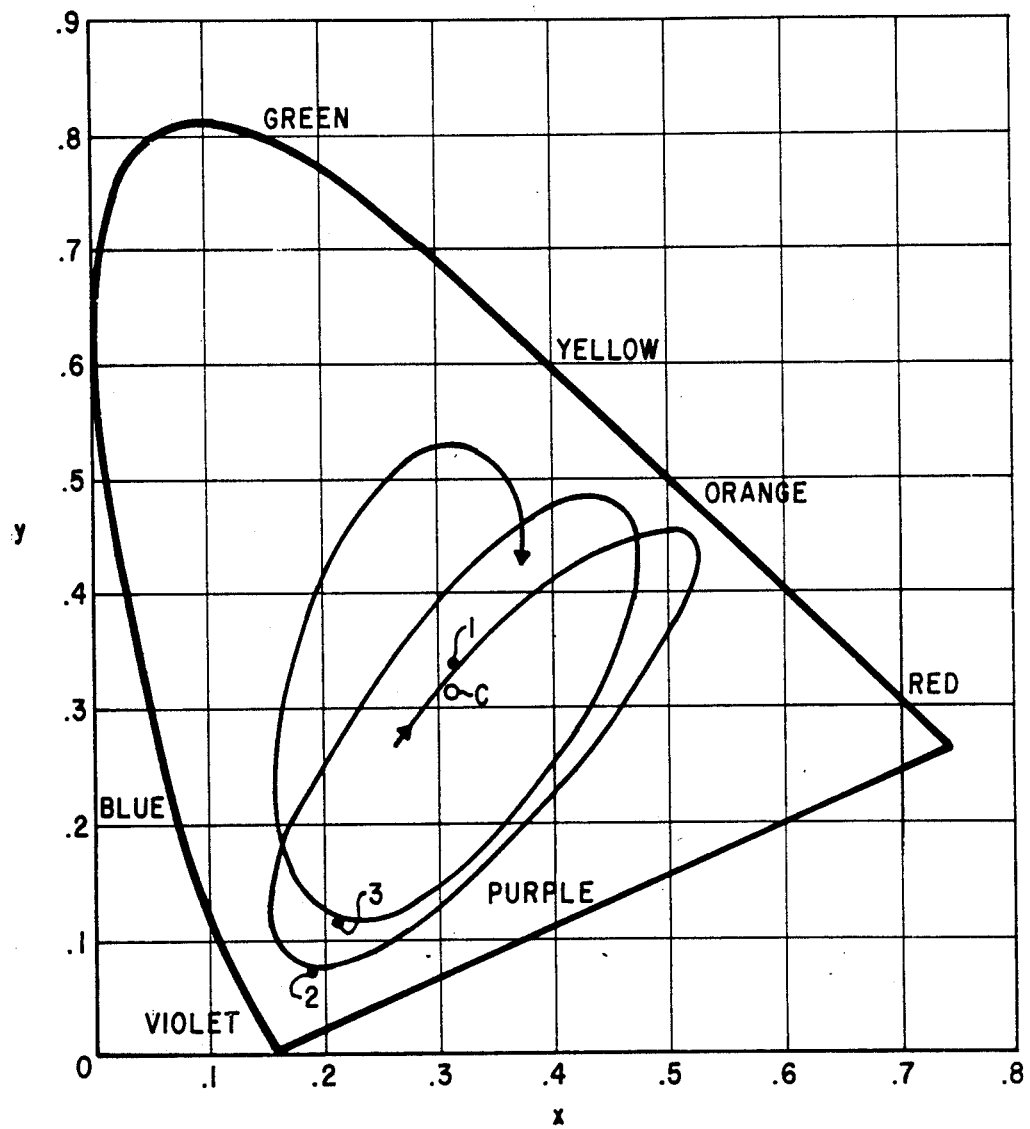
FIG. 2 is a chromaticity diagram with the x and y chromaticity coordinates measured on the corresponding x and y axes. The observed colors are marked about the periphery. Point C marks the coordinates for illuminant C in accordance with the Commission Internationale de L'Eclairage (CIE). The spiral shaped curve is a plot of the chromaticity coordinates of tin oxide films at increasing film thicknesses. Points 1, 2 and 3 mark the thicknesses corresponding with the reflected luminance maximum and minima shown in FIG. 1.
Figure 3:
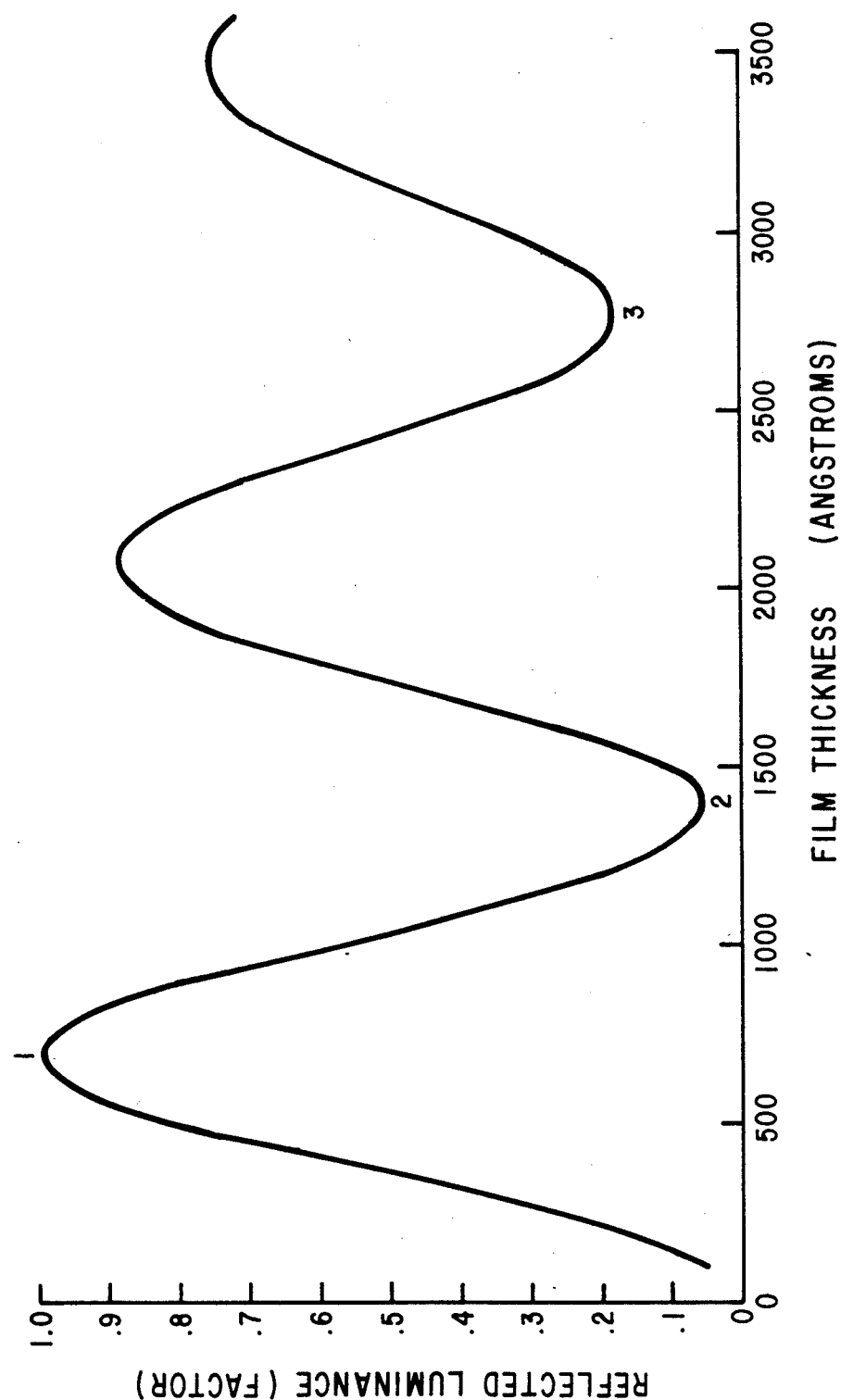
FIG. 3 illustrates the reflected luminance of a tin oxide film as a function of the film thickness. Point 1 marks the first maximum of the luminance curve, point 2 the first minimum, and point 3 the second minimum. The luminance factor is the ratio of the luminance of the sample, the tristimulus value Y as defined by the CIE system, to that of a perfect reflecting (or transmitting) primary standard identically illuminated.

The present invention provides an alternative method for masking the visible interference effects of an infrared reflecting film in a window unit. The present invention involves masking the visible interference effects of an infrared reflecting film by means of a second film having a uniform reflectance in the visible wavelength range combined with a luminous reflectance which is significantly higher than that of the infrared reflecting film. To produce a high transmittance, low emissivity unit, the thickness of the infrared reflecting film is chosen to correspond with the first minimum in the reflectance curve.

DESCRIPTION OF THE PREFERRED EMBODIMENTS

Infrared reflecting films exhibiting visible interference effects may be useful and can be masked on a monolithic sheet. Preferred articles in accordance with the present invention are multiple glazed window units comprising at least two panes, preferably both glass. Conventional glass compositions are useful, especially typical soda-lime-silica glass produced on a float line. Heat absorbing tinted glasses may be employed; but for high transmittance applications, clear glass is preferred.

Of the various infrared reflecting films which may be useful for solar energy control in accordance with the present invention, tin oxide is preferred. Tin oxide films may be deposited on glass surfaces by a variety of methods such as pyrolytic deposition, powder coating, chemical vapor deposition and cathode sputtering. Preferred methods in accordance with the present invention include pyrolysis of alkyltin fluorides as taught in U.S. Pat. Nos. 3,677,814 to Gillery and 4,263,335 to Wagner et al; chemical vapor deposition as taught in U.S. Pat. No. 3,850,679 to Sopko et al; powder coating as taught in U.S. Pat. No. 4,325,988 to Wagner and No. 4,344,986 to Henery; and cathode sputtering as taught in U.S. Pat. Nos. 3,477,936 and 3,506,556 to Gillery et al.

Preferred tin oxide infrared reflecting films in accordance with the present invention have a resistivity less than about 50 ohms per square, more preferably in the range of 20 to 30 ohms per square, and a low emissivity, preferably less than 0.4. The thickness of the film is chosen to correspond with a minimum in the luminous reflectance curve. Preferably, the film thickness corresponds to the first minimum since this point represents the lowest visible reflectance obtainable for a tin oxide film. This point corresponds with the second order blue interference effect at a thickness of about 1400 Angstroms. Coating process parameters are adjusted to yield the minimum resistivity for the given thickness to provide maximum infrared reflectance and minimum emissivity. If lower resistivity is desired for higher solar energy performance, a thicker infrared reflecting tin oxide film may be formed, preferably at a thickness near the second minimum in the luminous reflectance curve, most preferably at the thickness corresponding with the third order blue interference effect, about 2750 Angstroms.

In the preferred embodiment wherein the thickness of the tin oxide infrared reflecting film corresponds with the first minimum in the spectral reflectance curve, the film typically appears blue by interference effects, the visible reflectance is about 10 percent, and the resistivity is generally about 45 to 50 ohms per square. In order to mask the visible iridescence of the infrared reflecting tin oxide film, a uniformly and significantly more highly reflecting film is used, preferably with a luminous reflectance greater than 15 percent. Preferably, the masking film is a colorless film, i.e., one with a relatively flat spectral curve in the range of visible wavelengths and having a reflected luminance near 1.0. The masking film is applied on a substantially parallel surface, but is not in direct contact with the infrared reflecting film. If a thicker infrared reflecting film, e.g., a tin oxide film with a resistivity of 20 to 30 ohms per square and reflectance of about 12 percent which appears reddish blue by interference effects, is desired to lower the emissivity, a more highly reflective masking film maybe needed, for example, a film with a luminous reflectance greater than about 25 percent, such as a titanium oxide film with a luminous reflectance as illustrated in FIG. 1.

Interference masking films preferred in accordance with the present invention, in addition to being colorless and more visibly reflective than the infrared reflecting film, are also preferably non-absorbing, i.e., having an absorbance less than 25 percent, in order to maintain a high transmittance of visible light. A finished article comprising two sheets of clear glass, a tin oxide infrared reflecting film and a colorless masking film preferably has a visible transmittance of at least about 60 percent, and more preferably about 70 percent for residential use.

Interference masking films effective in accordance with the present invention include tin oxide, nickel oxide, chromium oxide, titanium dioxide, silicon and silicon dioxide. Interference masking films can be produced by any conventional coating technique such as pyrolysis, powder coating, chemical vapor deposition, vacuum coating, and cathode sputtering. A preferred interference masking film is a colorless tin oxide film having a visible reflectance high enough to mask the visible interference effects of the tin oxide infrared reflecting film, generally about 17 to 21 percent. The colorless tin oxide masking film may be preferably deposited by the same techniques previously described for depositing the tin oxide infrared reflecting film. The thickness of the tin oxide masking film is selected to correspond with a colorless reflectance, that is, a reflected luminance near 1.0, and is selected to correspond with the first maximum in the luminous reflectance curve, typically about 20 percent. At this film thickness, a resistivity greater than 100 ohms per square is typical. The masking film in this case contributes slightly to the solar energy control performance of the unit. Colorless tin oxide is a preferred masking film, therefore, for several reasons. It is durable, contributes to the solar energy performance of the article, and may be deposited from the same materials and by the same techniques as the infrared reflecting tin oxide film.

In one embodiment of the present invention, an infrared reflecting coating is applied to one surface of a glass sheet and a more visibly reflective masking film is deposited on the opposite surface of the same glass sheet. This coated product may be used monolithically or preferably may be mounted in a multiple glazed unit. In a preferred embodiment of the present invention, however, an infrared reflecting film is applied to one surface of a glass sheet, while a more visibly reflective masking film is applied to one surface of a second glass sheet. The two coated glass sheets are assembled into a multiple glazed window unit, preferably with both coatings facing the interior space in the unit. The preferred orientation for the multiple glazed unit in a building is with the infrared reflective film on the interior glass sheet. In another embodiment of the present invention, both sheets of a double glazed unit are coated on both sides, with tin oxide infrared reflecting films on the interior surfaces and colorless tin oxide masking films on the exterior surfaces. The two coatings may be applied simultaneously.

Articles in accordance with the present invention are effective for passive solar heating applications because the high transmittance allows solar energy (light and heat) into a structure, while the high infrared reflectance and low emissivity keep heat inside the structure from being lost.

The above descriptions illustrate the concept of the present invention, which will be further illustrated in detail by the specific examples which follow.

EXAMPLE I

A double glazed unit is assembled from two clear float glass sheets. The first sheet is coated on the surface facing the interior of the unit with an iridescent infrared reflecting tin oxide film having a resistivity of 50 ohms per square, emissivity of 0.38, and a luminous reflectance of 9.6 percent. The tin oxide film is deposited by pyrolysis of dibutyltin difluoride in solution which is sprayed onto a hot glass surface. The interference color of the film is blue as indicated by a dominant wavelength of 474 nanometers and an excitation purity of 36.9 percent for light reflected from the coated surface. The second glass sheet is coated on the surface facing the interior of the unit with an interference color masking tin oxide film which has a resistivity of 135 ohms per square and a luminous reflectance of 17.8 percent, and is colorless, characterized by a dominant wavelength of 571 nanometers and an excitation purity of 12.7 percent of light reflected from the coated surface. The masking film is deposited from dibutyltin difluoride powder which is pyrolyzed on contact with a hot glass surface. The assembled unit has a luminous transmittance of 64.7 percent and has masked interference effects, as indicated by exterior surface reflectances of 23.4 and 21.9 percent at dominant wavelengths of 478.8 and 47.9 nanometers and excitation purities of 8.8 and 10.8 percent.

EXAMPLE II

A double glazed unit is assembled as in Example I. The first clear glass sheet is coated with a tin oxide infrared reflecting film having a resistivity of about 45 to 50 ohms per square, emissivity of 0.37, luminous reflectance of 11.7 percent, and a blue interference color effect indicated by a reflected dominant wavelength of 479.2 and excitation purity of 34 percent. The second clear glass sheet is coated with a tin oxide masking film having a resistivity of 180 to 225 ohms per square, a luminous reflectance of 17.1 percent, and a colorless appearance characterized by a dominant wavelength of 476.4 nanometers and an excitation purity of 2.3 percent. The unit assembled with the coated surfaces facing the interior of the unit has a luminous transmittance of 67.1 percent, and has masked interference effects as indicated by exterior surface reflectances of 23.5 and 23.6 percent with dominant wavelengths of 483 and 484 nanometers and excitation purities of 9.0 and 8.0 percent.

EXAMPLE III

A single clear glass sheet is coated on one surface with an infrared reflecting tin oxide film having a resistivity of 50 ohms per square which exhibits interference effects, and on the other surface with a colorless, interference color masking tin oxide film. The double coated sheet has a luminous transmittance of 77.2 percent, reflectance from the first coated side of 17.6 percent with a dominant wavelength of 477.2 and excitation purity of 13.9 percent, and reflectance from the second coated side of 18.4 percent with a dominant wavelength of 477.15 and excitation purity of 10.6 percent.

EXAMPLE IV

A double glazed unit is assembled from two clear glass sheets. Both sheets are coated on the surfaces facing the interior of the unit with an iridescent infrared reflecting tin oxide film having a resistivity of 50 ohms per square, and on the exterior surfaces with a colorless, interference color masking tin oxide film as in the previous examples. The unit has a luminous transmittance of 59.8 percent and has masked interference color effects as indicated by luminous reflectances of 29.6 percent from both exterior surfaces, reflected dominant wavelengths of 482.7 and 483.6 nanometers, and excitation purities of 9.4 and 8.8 percent.

EXAMPLE V

A double glazed unit is assembled as in Examples I and II from a clear glass sheet with an infrared reflecting tin oxide film having a resistivity of 50 ohms per square, and a second clear glass sheet with a colorless, interference color masking tin oxide film having a resistivity of 110 ohms per square. The unit has a luminous transmittance of 59.8 percent and has masked interference effects as indicated by reflected dominant wavelengths of 482.7 and 483.1 nanometers and excitation purities of 11.9 and 12.3 percent.

EXAMPLE VI

To lower the emissivity, a glass sheet is coated on one surface with a tin oxide infrared reflective coating having a resistivity of 20 ohms per square, resulting in an emissivity of 0.33. The tin oxide coated surface exhibits strong interference color effects characterized by a third order red/blue color and higher reflectance than the previous examples. The opposite surface of the glass sheet is coated with a highly reflective silicon film. The dual coated glass sheet has a luminous transmittance of 26 percent, reflectance from the silicon coated surface of 49.4 percent with a dominant wavelength of 483.2 nanometers and excitation purity of 6.8 percent, and reflectance from the tin oxide coated surface of 30.0 percent with a dominant wavelength of 551.62 nanometers and excitation purity of 4.4 percent. Because of the high reflectance and absorbance of the silicon masking film, the coated glass is not high in transmittance, but it is low in emissivity, and the interference color effects of the tin oxide infrared reflective film are effectively masked.

EXAMPLE VII

A dual coated glass sheet as in Example VI is assembled into a double glazed window unit as in previous examples with a clear uncoated glass sheet. The coated sheet is oriented with the tin oxide film facing the interior of the unit and the silicon coating on the exterior surface. The unit has a luminous transmittance of 21 percent, reflectance from the silicon coated exterior surface of 50.5 percent with a dominant wavelength of 483.5 nanometers and excitation purity of 6.2 percent, and reflectance from the uncoated glass exterior surface of 31.5 percent with a dominant wavelength of 525.4 nanmeters and excitation purity of 2.6 percent. Because of the high reflectance and absorbance of the silicon masking film, the unit is not high in transmittance, but it is low in emissivity, and the interference color effects of the tin oxide infrared reflective film are masked.

EXAMPLE VIII

A dual coated glass sheet as in Example VI is assembled into a doubled glazed unit as in Example VII except that the coated sheet is oriented with the silicon coating facing the interior of the unit and the tin oxide infrared reflecting film on the exterior surface. The unit has a luminous transmittance of 21 percent, reflectance from the uncoated glass exterior surface of 47.4 percent with a dominant wavelength of 486 nanometers and excitation purity of 7.3 percent, and reflectance from the tin oxide infrared reflecting coated exterior surface of 30.7 percent with a dominant wavelength of 552.4 and an excitation purity of 5.0. Because of the high reflectance and absorbance of the silicon film, the unit is not high in transmittance, but it is low in emissivity, and the interference color effects of the tin oxide infrared reflecting film are masked.

EXAMPLE IX

A double glazed unit is assembled as in the previous examples. The first clear glass sheet is coated with a tin oxide infrared reflecting film having a resistivity of 25 ohms per square, an emissivity of 0.25 and reflectance from the coated surface of 10.1 percent with a dominant wavelength of 565.4 and an excitation purity of 27.8 percent. The second clear glass sheet is coated with a titanium dioxide film by pyrolysis of a solution of diisopropyl titanium diacetylacetonate. The titanium dioxide coating has a reflectance of 29.6 percent with a dominant wavelength of 479.2 nanometers and an excitation purity of 10.9 percent. The assembled unit, with both coatings on interior surfaces of the unit, has a luminous transmittance of 58.6 percent and has masked interference color effects as characterized by reflectances from the exterior surfaces of 33.7 and 30.5 percent at dominant wavelengths of 471.6 and 470.9 nanometers and excitation purities of 11.3 and 10.7 percent.

The above examples are offered only to illustrate the present invention. Various other infrared reflecting films such as indium oxide may be employed, as well as other interference color masking films such as nickel oxide, chromium oxide, and silicon dioxide. The transmittance, reflectance and resistance values may be varied by varying the relative coating thicknesses or by controlling coating process parameters in accordance with the various known coating techniques. The scope of the present invention is defined by the following claims.

We claim:

1. An article for solar energy control having at least two major substantially parallel surfaces comprising:
    a. at least one transparent sheet having two major substantially parallel surfaces;
    b. disposed on one major surface of said sheet a transparent, infrared reflecting film at a thickness which exhibits visible interference color effects in reflection; and
    c. disposed on another major surface of said article a transparent, uniformly reflecting masking film which does not exhibit interference color effects in reflection, said film having sufficient reflectance to mask the visible interference color effects in reflection of the infrared reflecting film, and said reflectance being uniform over the visible wave length range.

2. An article according to claim 1, wherein said transparent sheet is glass.

3. An article according to claim 2, wherein said article comprises at least two glass sheets.

4. An article according to claim 3, wherein the infrared reflecting film is tin oxide.

5. An article according to claim 4, wherein the masking film is selected from the group consisting of tin oxide, titanium oxide, nickel oxide, chromium oxide, silicon and silicon oxide.

6. An article according to claim 5, wherein the masking film is colorless tin oxide.

7. An article according to claim 6, wherein the infrared reflecting film has a resistivity not greater than about 50 ohms per square.

8. An article according to claim 7, wherein the thickness of the tin oxide infrared reflecting film corresponds with a minimum in the luminous reflectance curve.

9. An article according to claim 8, wherein the thickness of the tin oxide infrared reflecting film corresponds with the first minimum in the luminous reflectance curve.

10. An article according to claim 9, wherein the luminous reflectance of the tin oxide infrared reflecting film is not more than about 10 percent.

11. A high transmittance, low emissivity multiple glazed window unit for solar energy control comprising:
    a. two glass sheets in parallel spaced relation;
    b. a transparent infrared reflecting film which exhibits visible interference color effects in reflection on one surface of one of said glass sheets; and
    c. a transparent, uniformly reflecting masking film which does not exhibit interference color effects in reflection on a parallel surface of one of said sheets said film having sufficient visible reflectance to mask the interference color effects in reflection of the infrared reflecting film, and said reflectance being uniform over the visible wavelength range.

12. An article according to claim 11, wherein the infrared reflecting film is tin oxide.

13. An article according to claim 12, wherein the masking film is selected from the group consisting of tin oxide, nickel oxide, chromium oxide, titanium oxide, silicon and silicon dioxide.

14. An article according to claim 13, wherein the masking film is colorless tin oxide.

15. An article according to claim 14, wherein the thickness of the infrared reflecting tin oxide film is selected to correspond with the first minimum in the luminous reflectance curve and the thickness of the colorless tin oxide masking film is selected to correspond to the first maximum in the luminous reflectance curve.

16. A method for producing a noniridescent coated article for solar energy control comprising the steps of:
    a. coating one surface of a transparent substrate with an infrared reflecting film of a material which exhibits interference color effects in reflection at the desired effective thickness; and
    b. selecting a coating material and thickness sufficiently uniformly visibly reflecting to mask the visible interference color effects in reflectance of the infrared reflective film; and
    c. coating the surface substantially parallel with the infrared reflective film with a transparent, uniformly visibly reflecting masking film which does not exhibit interference color effects in reflection, said masking film having sufficient reflectance in the visible range to mask the interference color effects in reflection of the infrared reflecting film.

17. A method according to claim 16, wherein the infrared reflecting film is tin oxide.

18. A method according to claim 16, wherein the colorless masking film is selected from the group consisting of tin oxide, titanium oxide, nickel oxide, chromium oxide, silicon and silicon dioxide.

19. A method according to claim 18, wherein the masking film is colorless tin oxide.

20. A method according to claim 19, wherein the thickness of the infrared reflecting tin oxide film is selected to correspond with the first minimum in the luminous reflectance curve and the thickness of the colorless masking tin oxide film is selected to correspond with the first maximum in the luminous reflectance curve.

21. A method according to claim 16, wherein
    a. a first film of infrared reflecting tin oxide film is deposited on a first surface of a glass substrate; and
    b. a second film of colorless tin oxide is deposited on a second surface of said glass substrate as the masking film.

22. A method according to claim 16, wherein
    a. a first film of infrared reflecting tin oxide is deposited on a surface of a first glass substrate;
    b. a second film of colorless tin oxide is deposited on a surface of a second glass substrate as the masking film; and
    c. the two coated glass substrates are assembled in substantially parallel relation to form a multiple glazed unit.

23. A method according to claim 22, wherein the two glass substrates are assembled with the films facing each other across the interior space in the unit.

* * * * *

UNITED STATES PATENT AND TRADEMARK OFFICE
CERTIFICATE OF CORRECTION

PATENT NO. : 4,971,843
DATED : November 20, 1990
INVENTOR(S) : Joseph E. Michelotti et al.

It is certified that error appears in the above-identified patent and that said Letters Patent is hereby corrected as shown below:

Column 3, claim 16, line 13, delete "which" and insert --of the coating material and thickness selected in (b), whereby said film--;

line 14, after "reflection" the comma should be changed to a period and the remainder of the claim deleted.

Column 8, claim 18, line 2, delete "colorless".

Column 8, claim 21, line 2, delete "film" (second occurrence);

line 3, after "glass substrate" add --as the infrared reflecting film--.

Column 8, claim 22, line 3, after "glass substrate" add --as the infrared reflecting film--.

Signed and Sealed this

Fourteenth Day of July, 1992

Attest:

DOUGLAS B. COMER

*Attesting Officer*  *Acting Commissioner of Patents and Trademarks*